(12) United States Patent
Mizote et al.

(10) Patent No.: US 8,227,522 B2
(45) Date of Patent: Jul. 24, 2012

(54) SURFACE-MODIFIED BLADE RUBBER, WIPER UNIT, AND BLADE RUBBER SURFACE MODIFYING METHOD

(75) Inventors: Norihito Mizote, Isesaki (JP); Akio Katakai, Maebashi (JP); Masao Tamada, Takasaki (JP)

(73) Assignee: Mitsuba Corporation, Kiryu-Shi (JP)

( * ) Notice: Subject to any disclaimer, the term of this patent is extended or adjusted under 35 U.S.C. 154(b) by 1319 days.

(21) Appl. No.: 11/826,288

(22) Filed: Jul. 13, 2007

(65) Prior Publication Data
US 2008/0016644 A1 Jan. 24, 2008

(30) Foreign Application Priority Data

Jul. 19, 2006 (JP) ................. 2006-197023

(51) Int. Cl.
- *C08F 4/46* (2006.01)
- *C08J 3/28* (2006.01)
- *B60S 1/06* (2006.01)
- *B60S 1/38* (2006.01)

(52) U.S. Cl. ........ 522/120; 522/113; 522/114; 522/134; 522/135; 522/3; 522/144; 522/150; 522/157; 522/149; 264/405; 264/485; 264/494; 264/495; 15/250.001; 15/250.351; 15/250.361

(58) Field of Classification Search ......... 522/149, 522/3, 113, 114, 120, 134, 135, 144, 150, 522/157, 158, 159; 15/250.351, 250.001, 15/250.361; 264/405, 485, 494, 495
See application file for complete search history.

(56) References Cited

U.S. PATENT DOCUMENTS

| | | | | | |
|---|---|---|---|---|---|
| 4,170,664 | A | * | 10/1979 | Spenadel et al. | 427/498 |
| 5,051,312 | A | * | 9/1991 | Allmer | 428/458 |
| 5,110,621 | A | * | 5/1992 | Sudo et al. | 427/503 |
| 5,429,839 | A | * | 7/1995 | Graiver et al. | 427/155 |
| 5,527,618 | A | * | 6/1996 | Graiver et al. | 428/447 |
| 5,872,190 | A | * | 2/1999 | Gutowski et al. | 525/359.4 |
| 6,001,894 | A | * | 12/1999 | Ottersbach et al. | 522/149 |
| 6,287,642 | B1 | | 9/2001 | Leutsch et al. | |
| 6,451,386 | B1 | * | 9/2002 | Simonetti | 427/512 |
| 2005/0147824 | A1 | * | 7/2005 | Myers | 428/411.1 |
| 2010/0252749 | A1 | * | 10/2010 | Lay et al. | 250/459.1 |

FOREIGN PATENT DOCUMENTS

| | | | |
|---|---|---|---|
| GB | 1120803 A | * | 7/1968 |
| JP | A-59-139926 | | 8/1984 |
| JP | A-5-320394 | | 12/1993 |
| JP | A-2001-527025 | | 12/2001 |
| JP | A-2002-506487 | | 2/2002 |
| JP | A-2002-161154 | | 6/2002 |
| JP | A-2003-138216 | | 5/2003 |
| WO | WO 99/32705 | | 7/1999 |

OTHER PUBLICATIONS

Jan. 5, 2012 Notification of Reasons for Refusal issued in Japanese Application No. 2006-197023 with English-language translation.

* cited by examiner

*Primary Examiner* — Sanza McClendon (74) *Attorney, Agent, or Firm* — Oliff & Berridge, PLC (57) ABSTRACT

A surface-modified blade rubber includes a surface modified by being subjected to irradiation treatment that generates radical active sites in the blade rubber and polymerization for graft polymerization starting from a generated radical active site. A method for modifying a blade rubber surface includes subjecting rubber of a blade rubber to irradiation treatment that generates radical active sites and polymerization for graft polymerization starting from a generated radical active site.

3 Claims, 10 Drawing Sheets

Portion
without monomer adhered

Coincidence irradiation

Radiation irradiation + graft polymerization

Fig. 7A

Monomer concentration and absorbance changes

Fig. 7B

Irradiation dose and absorbance changes

Fig. 8A Monomer concentration and contact angle changes

Fig. 8B Irradiation dose and absorbance changes

Fig. 8C Contact angle and absorbance

SURFACE-MODIFIED BLADE RUBBER, WIPER UNIT, AND BLADE RUBBER SURFACE MODIFYING METHOD

CROSS-REFERENCE TO RELATED APPLICATION

This application claims priority from Japanese Patent Application No. 2006-197023, filed Jul. 19, 2006. The entire disclosure of which is incorporated by reference in its entirety.

BACKGROUND

The present invention relates to a surface-modified blade rubber, a wiper unit, and a blade rubber surface modifying method.

Figure 1A:
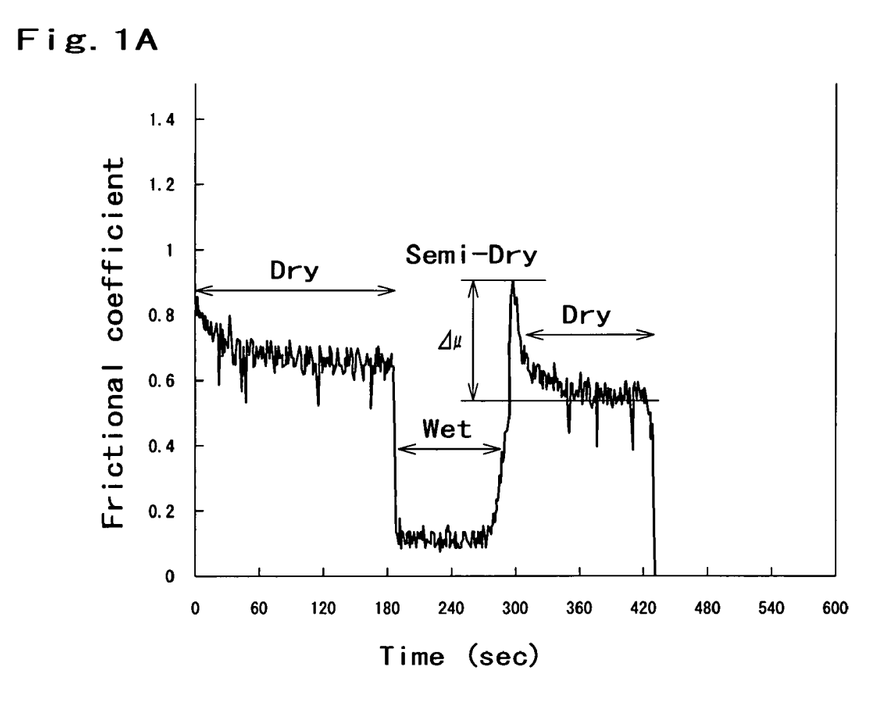
FIG. 1A is a graph showing the development of wiper friction behavior.

It is generally known that, as shown in FIG. 1A, the frictional resistance in a blade runner that is provided on a wiper blade increases when the blade runner transitions from a wet state (which is caused by rain for example) to a dry state when a glass of a vehicle starts drying after it stops raining. This is called a semi-dry state. The increase in frictional resistance in this semi-dry state is at a maximum friction point during the semi-dry state. The wiper system must thus be designed in consideration of this maximum friction point. However, this obstructs the downsizing of the system.

Therefore, in order to lower the frictional resistance of the wiper blade, there are also known a wiper blade whose rubber surface is cured by chlorine treatment (for example, Japanese Published Unexamined Patent Application No. S59-139926 and Japanese Published Unexamined Patent Application No. H05-320394), and a wiper blade whose rubber surface is cured by being impregnated with an isocyanate treatment liquid (for example, Japanese Published Unexamined Patent Application No. 2002-161154).

SUMMARY

However, the wiper blade whose rubber surface is cured becomes high in hydrophilicity on the rubber surface. As a result, on the contrary, friction easily increases in the semi-dry state and friction noise easily occurs. In addition, chlorine treatment and isocyanate treatment eventually deteriorate the rubber surface and thus compromises durability. In addition, the semi-dry state occurs at an unsteady moment when the glass surface changes from a water adhering state into a dry state. Thus, it difficult to predict the occurrence of this semi-dry state in order to properly cope with the disadvantages thereof.

The present invention thus provides, among other things, a surface-modified blade rubber that includes a surface modified by being subjected to irradiation treatment that generates radical active sites in the blade rubber and polymerization for graft polymerization starting from a generated radical active site.

According to an exemplary aspect of the invention, the polymerization is applied after the irradiation treatment.

According to an exemplary aspect of the invention, the irradiation treatment and the polymerization are simultaneously performed.

According to an exemplary aspect of the invention, the graft polymerization is performed by using a hydrophobic monomer.

According to an exemplary aspect of the invention, the hydrophobic monomer is a polymerizable monomer having at least one or more of any one of a vinyl group ($CH_2=CH-$), isopropenyl group ($CH_2=C(CH_3)-$), and allyl group ($CH_2=CHCH_2-$) in a molecule, and having, at a molecular end, a hydrophobic structure of any one of a hydrocarbon, organosilicon, and fluorine carbide, or a functional group into which hydrophobic properties can be introduced by secondary reaction after grafting.

According to an exemplary aspect of the invention, an absorbed dose in the irradiation treatment is not less than 5 kGy, and a reaction solution concentration in the polymerization is not less than 10 weight %.

According to an exemplary aspect of the invention, a contact angle between one side surface of the blade rubber and a water drop dripping onto the one side surface is not less than 90 degrees.

The present invention also provides, among other things, a wiper unit that includes a wiper arm provided so as to freely swing on a vehicle; a rubber holder attached to the wiper arm; and a blade rubber that is held by the rubber holder and wipes a window glass surface of the vehicle. The blade rubber includes a head portion in which a pair of fitting grooves are formed that fit leaf spring members that are elastically deformable in directions of separating from the window glass, a coupling portion that is formed continuously with the head portion, is held by the rubber holder, and has a width in wiping directions of the wiper unit narrower than that of the head portion, a neck portion that is formed continuously with the coupling portion and has a width in the wiping directions narrower than that of the coupling portion, and a lip portion that is formed continuously with the neck portion and comes into contact with the window glass, wherein a hydrophobic monomer is adhered to at least one side surface in at least one wiping direction of the lip portion.

According to an exemplary aspect of the invention, the hydrophobic monomer is adhered to both side surfaces in wiping directions of the lip portion of the blade rubber, and the hydrophobic monomer is not adhered to a cut surface of the lip portion of the blade rubber.

The present invention also provides, among other things, a method for modifying a blade rubber surface that includes subjecting rubber of a blade rubber to irradiation treatment that generates radical active sites and polymerization for graft polymerization starting from a generated radical active site.

According to aspects of the invention, it is possible to modify the surface of the blade rubber and prevent or reduce the occurrence of a semi-dry state.

According to aspects of the invention, it is possible to easily modify the rubber surface of the blade rubber.

According to aspects of the invention, it is possible to more reliably prevent or reduce the occurrence of a semi-dry state by making hydrophobic the rubber surface of the blade rubber.

According to aspects of the invention, the contact between the rubber surface of the blade rubber and a window surface is satisfactory in suppressing friction.

According to aspects of the invention, it is possible to provide a wiper unit that more reliably prevents or reduces the occurrence of a semi-dry state by making hydrophobic the rubber surface of the blade rubber, makes satisfactory the contact between the rubber surface of the blade rubber and a window glass, and suppresses friction.

BRIEF DESCRIPTION OF THE DRAWINGS

Various exemplary embodiments will be described with reference to the drawings, wherein:

FIG. 7 concerns MPTS and HEMA graft-polymerized, respectively.

FIG. 8 concerns MPTS and HEMA graft-polymerized, respectively.

DETAILED DESCRIPTION OF EMBODIMENTS

Next, an embodiment of the present invention will be described. The present invention relates to a modification of a rubber surface of a blade rubber for wiping a window surface, and more specifically, to the surface-modified blade rubber, a wiper unit, and a blade rubber modifying method. For modification of a rubber surface of a blade rubber in the present invention, rubber molecules of the blade rubber are excited to generate radical active sites. Starting from the radical active sites, the rubber surface is graft-polymerized with a binding start portion (origin), whereby a monomer is bound to the rubber surface of the blade rubber and the vicinity of the surface inner side thereof to modify the rubber surface. Thereby, the hydrophobic properties are increased to make it is possible to prevent or reduce the occurrence of a semi-dry state, whereby smooth window wiping is realized.

Figure 1B:
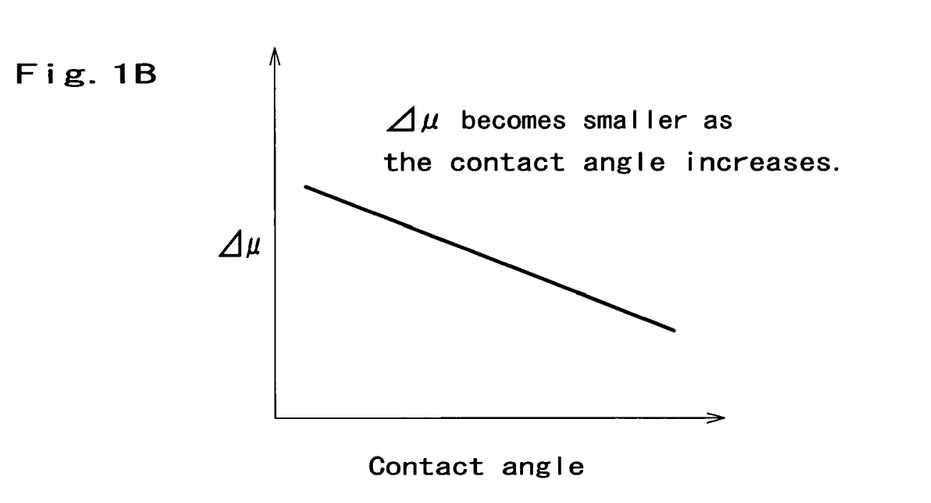
FIG. 1B is a graph showing the correlation between the contact angle and the frictional coefficient Δμ.

During an investigation of semi-dry friction factors, it was suggested that the behavior of the friction changes according to a change in bulk meniscus of water on the friction surface. By developing this, it was reasoned that if the occurrence of the bulk meniscus force of water is reduced by increasing the contact angle by lowering the surface energy of the rubber surface as shown in FIG. 1B, a semi-dry state will not occur. That is, stable friction could be realized by reducing the frictional coefficient Δμ, and the frictional coefficient could be reduced by increasing the hydrophobic properties of the rubber surface that influences the contact angle. Based on this reasoning, the present invention was developed.

As rubber to be used in the present invention, normally known rubber can be employed, and for example, a single or a mixture of a plurality of natural rubber (NR), isoprene rubber (IR), butadiene rubber (BR), styrene-butadiene copolymer rubber (SBR), acrylonitrile-butadiene copolymer rubber (NBR), chloroprene rubber (CR), fluororubber (FKM), butyl rubber (IIR), ethylene-propylene copolymer rubber (EPM), ethylene-propylene-diene terpolymer rubber (EPDM), hydrogenated nitrile rubber (hydrogenated NBR), silicone rubber, epichlorohydrin rubber (CO, ECO), polysulfide rubber (T), and urethane rubber (U) can be exemplified. A blade rubber can be exemplified that is manufactured by vulcanizing, according to a conventionally known method such as press vulcanization, this rubber material blended with normally known additive agents such as a vulcanizing agent, a vulcanization accelerator, a softener, an antioxidant, a filler, a silane coupling agent, silica, carbon black.

Figure 2:
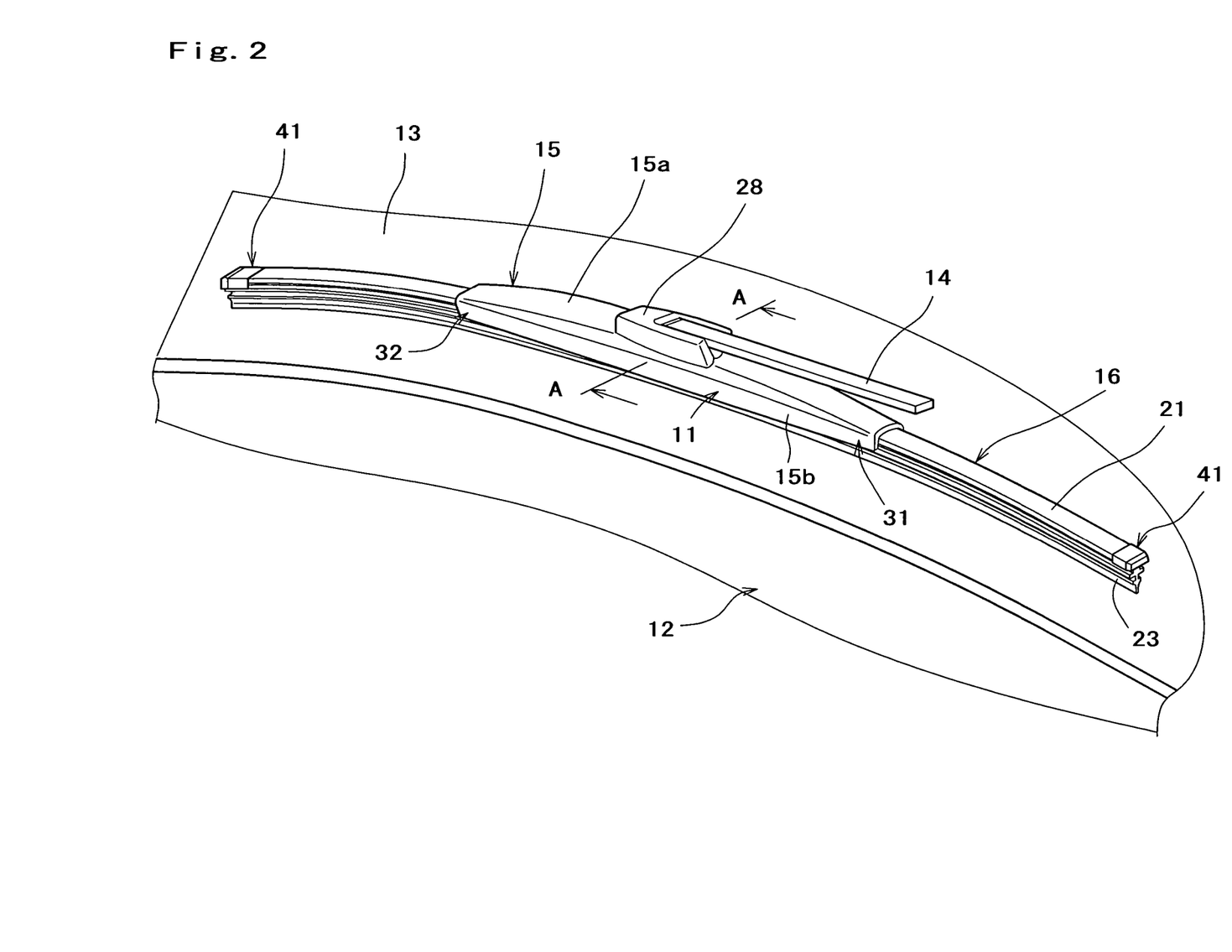
FIG. 2 is a perspective view showing a wiper blade of an embodiment of the present invention.

FIG. 2 is a perspective view showing a wiper blade of an embodiment of the present invention. The wiper blade 11 shown in FIG. 2 is provided for wiping off objects adhered to a front window glass 13 (hereinafter, referred to as window glass 13) of a vehicle 12, such as rainwater and spray from a vehicle in front.

This wiper blade 11 includes a rubber holder 15 to be attached to a tip end of a wiper arm 14 provided so as to freely swing on the vehicle 12, and a blade rubber 16 held by the rubber holder 15. The blade rubber 16 is in elastic contact with the window glass 13 by a pressing force of the wiper arm 14 applied via the rubber holder 15. Then, when the wiper arm 14 is swung (driven) by a wiper motor (not shown), the wiper blade 11 reciprocatingly swings, together with the wiper arm 14, on the window glass 13 and wipes the glass surface.

Figure 3A:
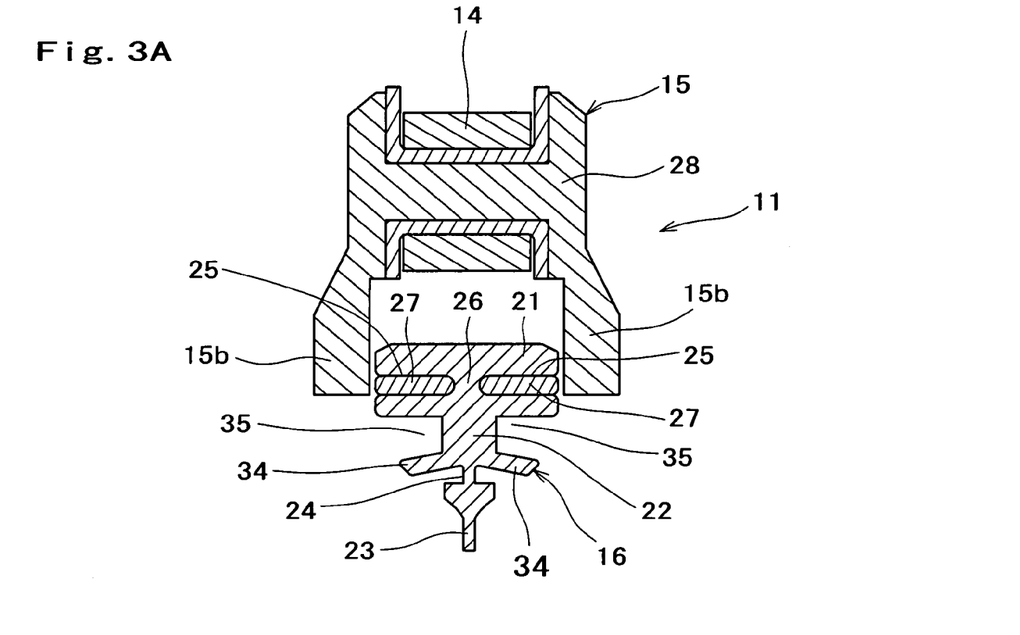
FIG. 3A is a sectional view along A-A line of FIG. 2.
Figure 3B:
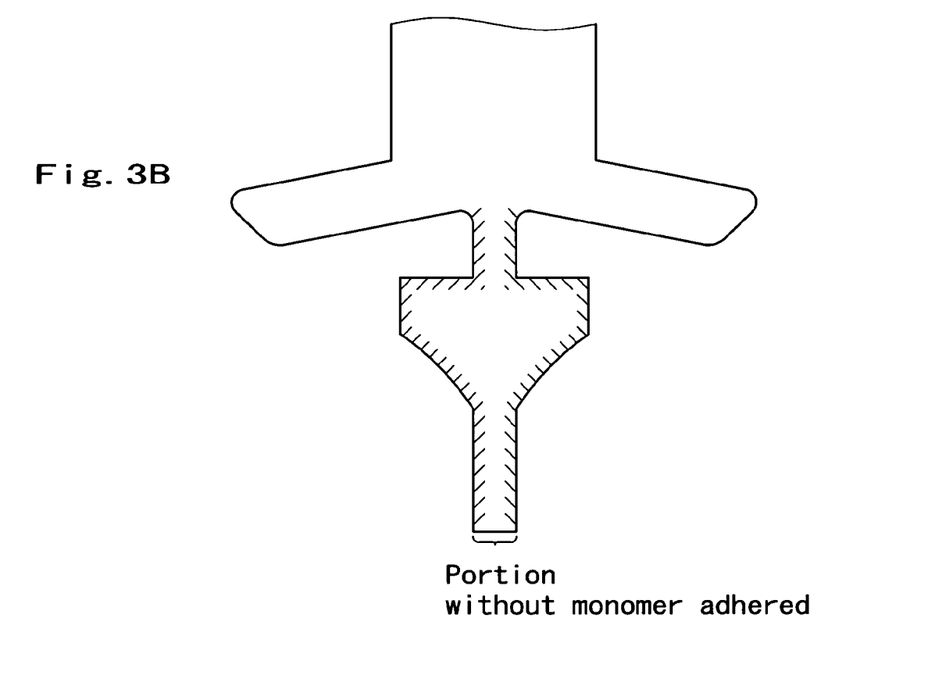
FIG. 3B is an enlarged view of a lip portion of FIG. 3A.

FIG. 3A is a sectional view along the A-A line of FIG. 2, and FIG. 3B is an enlarged view of a lip portion of FIG. 3A.

As shown in FIG. 3A, the blade rubber 16 to be used in this wiper blade 11 is made of natural rubber or synthetic rubber and formed into a rod shape having a uniform sectional shape in a longitudinal direction. The blade rubber 16 includes a head portion 21, a coupling portion 22 continued to the head portion 21, and a lip portion 23 with the lip portion 23 coming into contact with the window glass 13. The lip portion 23 is coupled to the coupling portion 22 via a neck portion 24 formed to be narrower in width in wiping directions than the coupling portion 22 and the lip portion 23. Thereby, the lip portion 23 is tiltable to the downstream side of the wiping directions with respect to the head portion 21 and the coupling portion 22.

On both sides in the wiping directions of the head portion 21, fitting grooves 25 recessed in the wiping directions are formed. These fitting grooves 25 are extended in a longitudinal direction so as to reach from one end to the other end in the longitudinal direction of the head portion 21. The fitting grooves 25 are arranged in wiping directions so as to be isolated from each other by a partition 26. In these fitting grooves 25, leaf spring members (vertebras) 27 are fitted.

The leaf spring members 27 are formed to be tabular so as to have a length substantially equal to that of the blade rubber 16 by punching a plate member of steel or the like, and is elastically deformable in a direction perpendicular to the window glass 13. Therefore, the blade rubber 16 to which the leaf spring members 27 are fitted is made elastically deformable in a direction perpendicular to the window glass 13 integrally with the leaf spring members 27, that is, in a direction of changing the degree of curvature with respect to the glass surface. The leaf spring members 27 curve more than a curvature of the window glass 13 toward its elastically deformable direction in a natural state. Thereby, in a state that the blade rubber 16 to which the leaf spring members 27 are fitted are separated from the window glass 13, and they curve more greatly than the window glass 13.

On the other hand, the rubber holder 15 is formed from a resin material into a shape having a U-shaped section including a top wall 15a and a pair of side walls 15b, and its length is set to approximately half the blade rubber 16. Substantially on a middle portion in the longitudinal direction of the top wall 15a, an attaching portion 28 is provided, and the rubber holder 15 is attached, at this attaching portion 28, to the tip end of the wiper arm 14.

On one end in the longitudinal direction (end which comes close to the swing center of the wiper arm 14 when the wiper blade 11 is attached to the wiper arm 14) of the rubber holder 15, a holding portion 31 is provided, and on the other end in the longitudinal direction of the rubber holder 15, a holding portion 32 is provided.

Figure 4A:
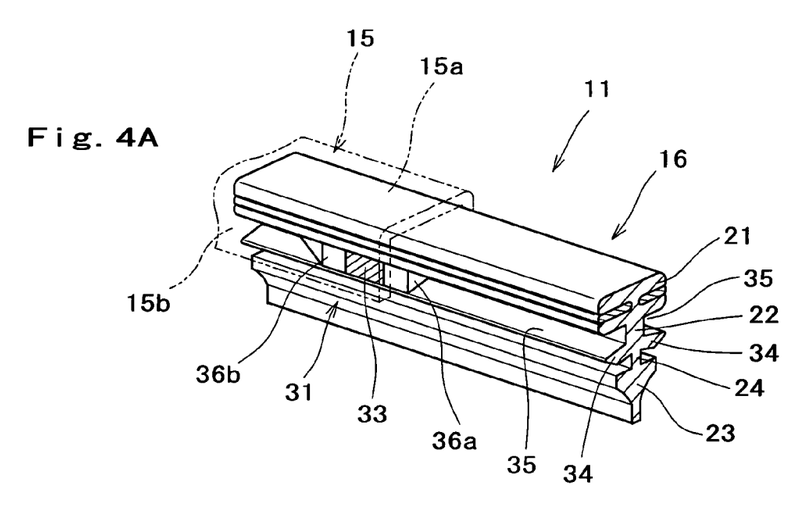
FIG. 4A and FIG. 4B are explanatory views showing details of holding portions of the rubber holder shown in FIG. 2, respectively.

As shown in FIG. 4A, the holding portion 31 has a pair of holding claws 33 (only one side is shown in the drawing, however, the other side is also provided with a similar holding claw 33) formed integrally with side walls 15b, respectively. These holding claws 33 are formed into projections having rectangular sections projecting from the side walls 15b in a direction orthogonal to the longitudinal direction of the blade rubber 16 and parallel to the wiping directions. On the other hand, between the head portion 21 and the lip portion 23 of the blade rubber 16, holding grooves 35 longitudinally extend, which are partitioned by the head portion 21 and arms 34 formed on the coupling portion 22, and the holding claws 33 engage with the corresponding holding grooves 35, respectively. That is, the head portion 21 of the blade rubber 16 is sandwiched by the holding claws 33, both side surfaces 15b, and the top wall 15a. Thereby, the head portion 21 is held by the holding portion 31.

In the holding grooves 35, a pair of stoppers 36a, 36b are provided, which sandwich the holding claws 33 from the longitudinal direction, and the holding claws 33 are restricted by these stoppers 36a, 36b from moving in a direction along the holding grooves 35 with respect to the blade rubber 16. That is, the blade rubber 16 is held by the rubber holder 15 in a state that it is positioned in the longitudinal direction at the holding portion 31.

Figure 4B:
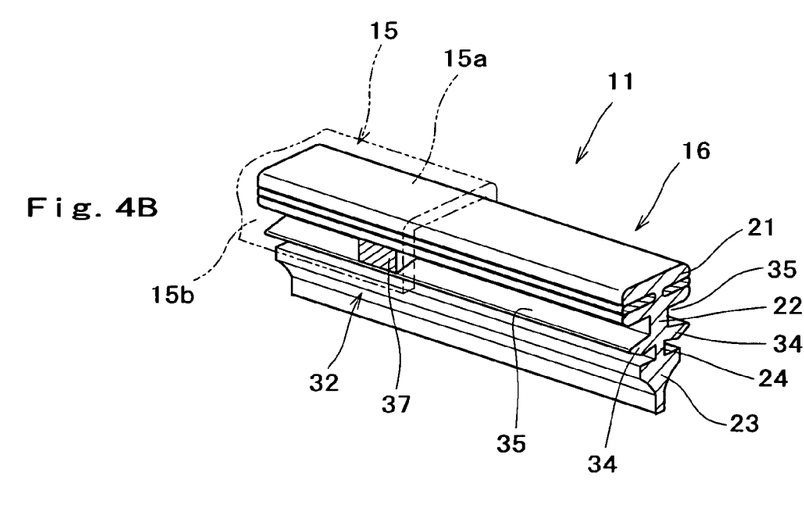

Similarly, as shown in FIG. 4B, the holding portion 32 has a pair of holding claws 37 (only one side is shown in the drawing, however, the other side is also provided with a similar holding claw 37) formed integrally with the side walls 15b, respectively. These holding claws 37 are formed into projections having rectangular sections projecting from the side walls 15b in a direction orthogonal to the longitudinal direction of the blade rubber 16 and in parallel to the wiping directions. The holding claws 37 engage with corresponding holding grooves 35, respectively, and thereby, the head portion 21 of the blade rubber 16 is sandwiched by the holding claws 37, both side walls 15b, and the top wall 15a and held by the holding portion 32. The stoppers 36a, 36b are not provided on portions of the holding grooves 35 corresponding to the holding portion 32 so that the holding claws 37 are movable along the holding grooves 35.

Thus, in this wiper blade 11, the holding portions 31, 32 are provided on both ends in the longitudinal direction of the rubber holder 15 of the blade rubber 16, and the blade rubber 16 is held at the two points of these holding portions 31, 32. Therefore, when the pressing force from the wiper arm 14 is applied to the rubber holder 15 via the attaching portion 28, the pressing force is applied to the blade rubber 16 from two points on both ends of the rubber holder 15, that is, from the holding portions 31, 32 and both ends of the top wall 15a corresponding to the holding portions 31, 32. Thereby, the blade rubber 16 comes into elastic contact with the window glass 13.

Irradiation treatment usable for generating radical active sites by activating the rubber surface include, for example, ultraviolet irradiation treatment, plasma irradiation treatment, electron irradiation treatment, radiation ($\alpha$-ray, $\beta$-ray, and $\gamma$-ray) irradiation treatment, ion beam irradiation treatment and corona discharge irradiation treatment, etc., and by applying such irradiation treatment, radical active sites are generated in the rubber, and starting from these radical active sites, graft polymerization proceeds. When performing irradiation treatment by means of preirradiation, it is desirable that the irradiation is performed in a nitrogen atmosphere, and also at the time of graft polymerization reaction, binding to a monomer in a nitrogen atmosphere is desirable.

In the present invention, as a method for promoting graft polymerization reaction starting from the generated radical active sites includes a method using preirradiation in which graft polymerization is performed after generating radical active sites by applying irradiation treatment to the rubber, and a method using coincidence irradiation treatment in which generation of the radical active sites and graft polymerization are performed coincidentally. The present invention can be carried out according to either method.

Figure 5:
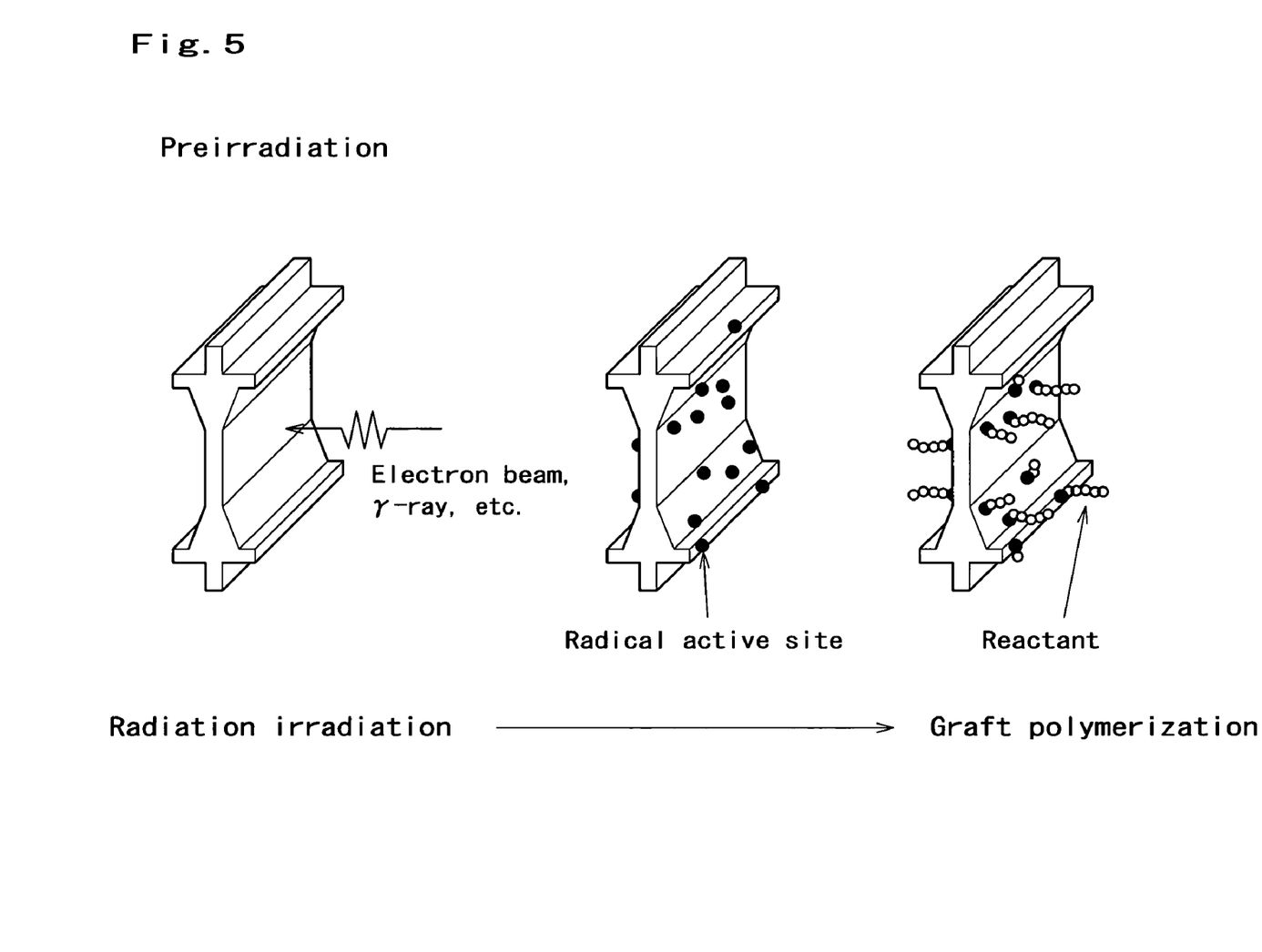
FIG. 5 is an explanatory view showing a reaction pattern of preirradiation treatment.
Figure 6:
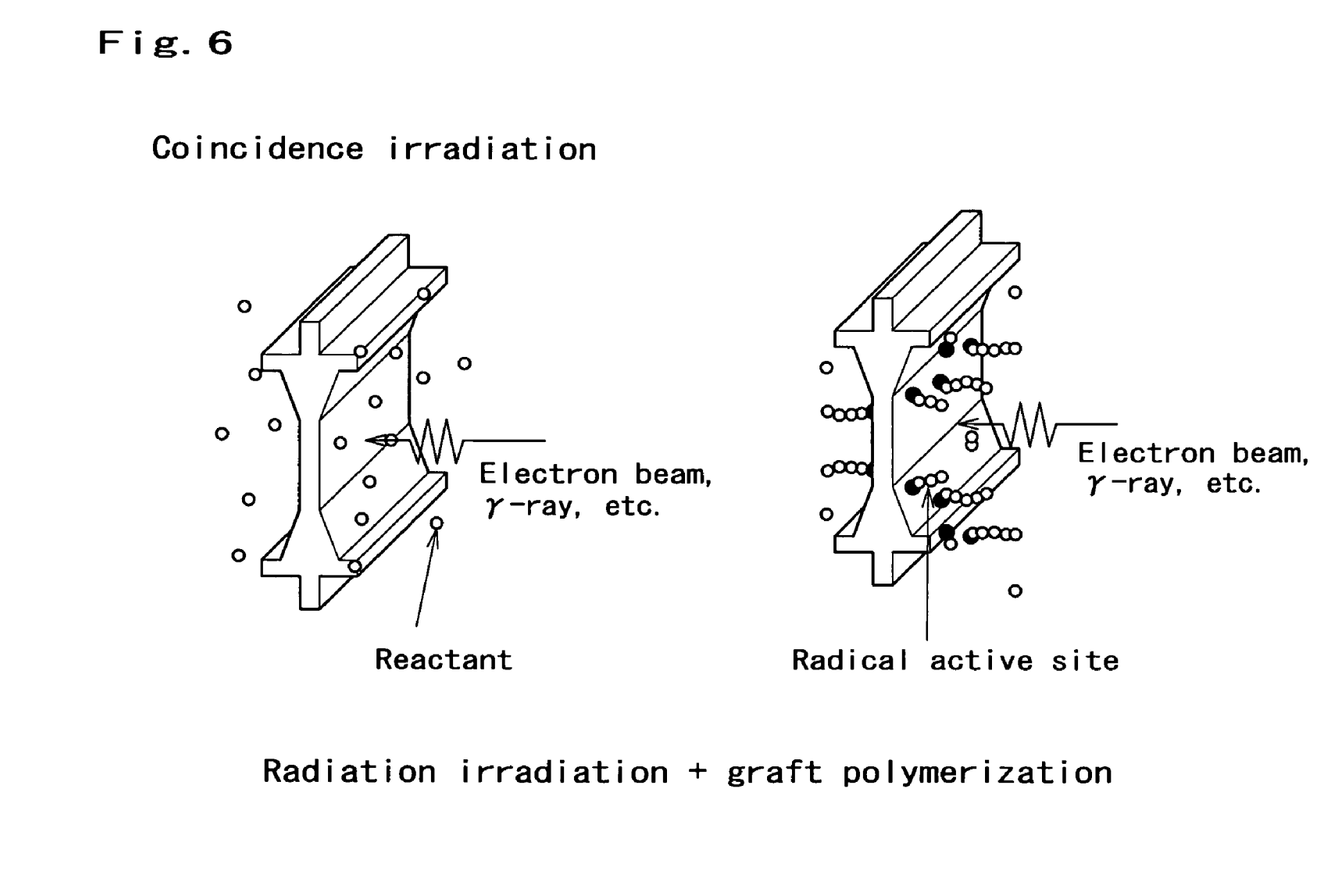
FIG. 6 is an explanatory view showing a reaction pattern of coincidence irradiation treatment.

FIG. 5 is an explanatory view showing a reaction pattern of the preirradiation treatment, and FIG. 6 is an explanatory view showing a reaction pattern of coincidence irradiation treatment. Both FIG. 5 and FIG. 6 show a state before cutting the blade rubber, that is, only lip portions of blade rubber moldings molded so that lip portions of a pair of the blade rubbers face each other are shown.

In the reaction process of preirradiation treatment, as diagrammatically shown in FIG. 5, irradiation treatment for generating radical active sites of an electron beam or the like in the rubber is performed. Starting from the generated radical active sites, graft polymerization is applied, and in the reaction process of coincidence irradiation treatment, as diagrammatically shown in FIG. 6, under the presence of a reactant for graft polymerization, irradiation treatment for generating radical active sites of an electron beam or the like in the rubber are performed to promote the generation of radical active sites and graft polymerization. In the coincidence irradiation in the present invention, irradiation for forming radical active sites of the above-described electron beam or the like is performed in a state that a monomer to be used for graft polymerization is made to adhere to the surface of the blade rubber in advance by means of coating or immersion. The adsorbed dose is desirably 10 to 50 kGy in the case of the coincidence irradiation and 50 to 200 kGy in a deoxygenated state in the case of preirradiation.

For the graft polymerization, a normally known method can be employed, however, as a monomer to be used for graft polymerization, a compound having at least one or more of any one of a vinyl group ($CH_2=CH-$), isopropenyl group ($CH_2=C(CH_3)-$), and allyl group ($CH_2=CHCH_2-$) in a molecule can be used. For example, hydrophilic monomers and hydrophobic monomers such as acrylic acid (AA), methacrylic acid (MAA), 2-hydroxyethyl methacrylate (HEMA), 2-hydroxyethyl acrylate (HEA), methyl methacrylate (MMA), and ethyl methacrylate, vinyl methacrylate, cyclohexyl methacrylate, dodecyl methacrylate, trimethylsilyl methacrylate, trimethoxysilyl propyl methacrylate, 3-(methacryloyloxy) propyl-tris (trimethylsiloxy) silane, methacrylate 1H,1H,3H-tetrafluoropropyl, acrylate 2,2,2-trifluoroethyl, and methacrylate 2-(perfluorobutyl)ethyl, can be used. A single or a mixture of a plurality of these monomers can be used as a monomer for graft polymerization reaction.

For the graft polymerization, a normally known method can be employed, however, as a hydrophobic monomer to be used for the graft polymerization, a polymerizable monomer having at least one or more of any one of a vinyl group ($CH_2$=CH—), isopropenyl group ($CH_2$=C($CH_3$)—), and allyl group ($CH_2$=$CHCH_2$—) in a molecule, and having a hydrophobic structure of any one of a hydrocarbon, organosilicon, and fluorine carbide at a molecular end, or a compound having a functional group into which hydrophobic properties can be introduced by secondary reaction after grafting can be used. For example, ethyl methacrylate, vinyl methacrylate, styrene, cyclohexyl methacrylate, dodecyl methacrylate, ethyl acrylate, vinyl acrylate, cyclohexyl acrylate, dodecyl acrylate, trimetylsilyl methacrylate, trimethoxysilylpropyl methacrylate, 3-(methacryloyloxy) propyl-tris (trimethylsiloxy) silane, trimethylsilyl acrylate, trimethoxysilylpropyl acrylate, 3-(acryloyloxy) propyl-tris (trimethylsiloxy) silane, methacrylate 1H,1H,3H-tetrafluoropropyl, methacrylate 2,2,2-trifuluoroethyl, methacrylate 2-(perfluorobutyl)ethyl, acrylate 1H, 1H, 3H-tetrafluoropropyl, acrylate 2,2,2-trifuluoroethyl, methacrylate 2-(perfluorobutyl)ethyl, and derivatives of these can be used. A single or a mixture of a plurality of these hydrophobic monomers can be used as a monomer for the graft polymerization reaction.

The blade rubber is manufactured as a pair of blade rubber moldings formed so that lip portions 23 face each other. Thereafter, the pair of blade rubber moldings are cut in the longitudinal direction at the lip portions, whereby a blade rubber is formed. At this time, the pair of blade rubber moldings are cut in a state that the graft-polymerized monomer adheres thereto, so that no monomer adheres to the cut surface of the blade rubber as shown in FIG. 3B. Normally, edge portions between both side surfaces of the lip portion and the cut surface of the blade rubber wipe a window glass, so that the blade rubber can wipe a window glass by both side surfaces of the lip portion to which the monomer is bound. Therefore, the cut surface does not wipe the window glass. It is not necessary to apply irradiation for forming radical active sites of an electron beam or the like and graft polymerization to the portions such as the head portion 21 of the blade rubber molding which do not come into contact with the window glass 13, so that the portions of the blade rubber molding that are not irradiated with an electron beam are masked, and only necessary portions such as the lip portion of the blade rubber molding may be irradiated with an electron beam or the like.

Next, examples will be described in detail.

Figure 7A:
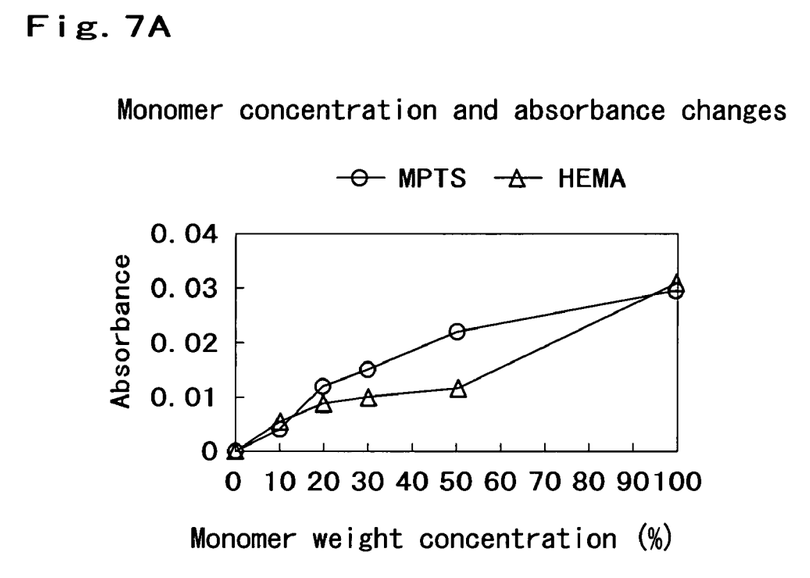
FIG. 7A is a graph showing the relationship between the monomer weight concentration and the absorbance when the irradiation dose is set to 10 kGy.
Figure 7B:
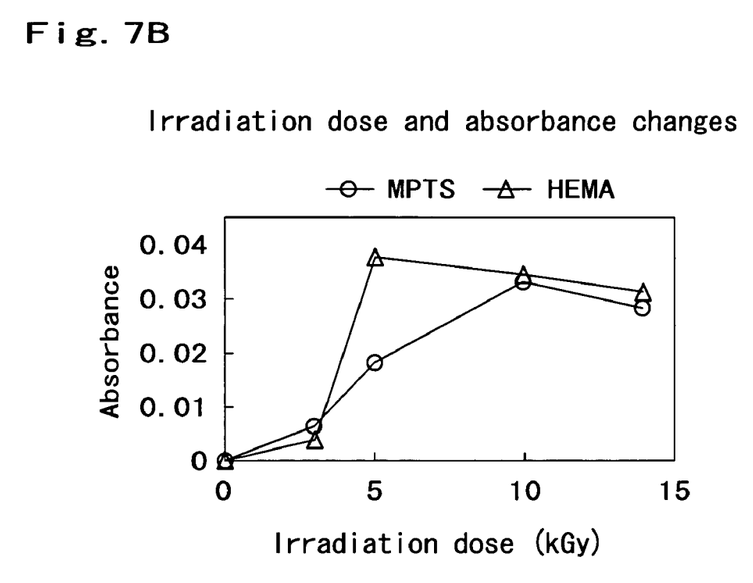
FIG. 7B is a graph showing the relationship between the irradiation dose and the absorbance when the monomer concentration is set to 100%.
Figure 8A:
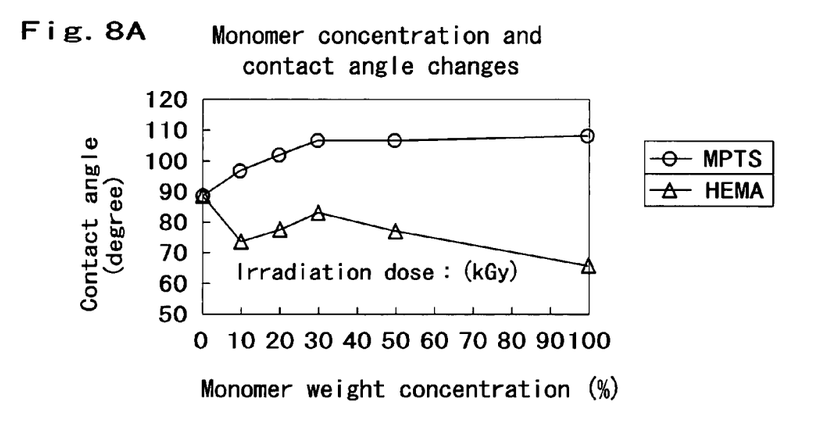
FIG. 8A is a graph showing the relationship between the monomer weight concentration and the contact angle when the irradiation dose is set to 10 kGy.
Figure 8B:
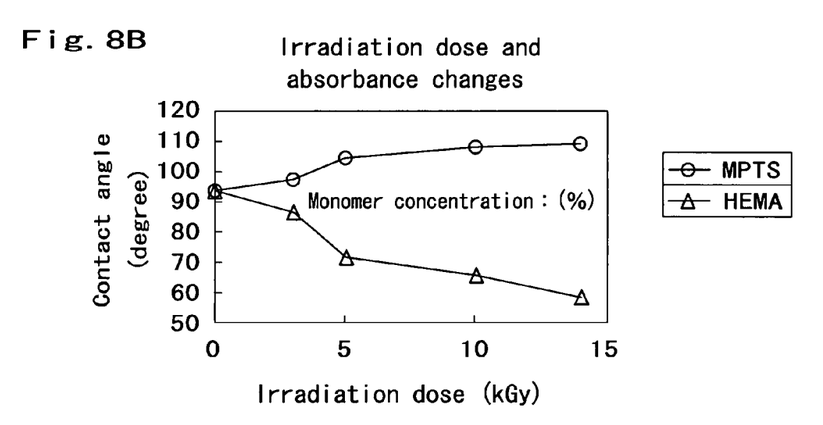
FIG. 8B is a graph showing the relationship between the irradiation dose and the contact angle when the monomer concentration is set to 100%.
Figure 8C:
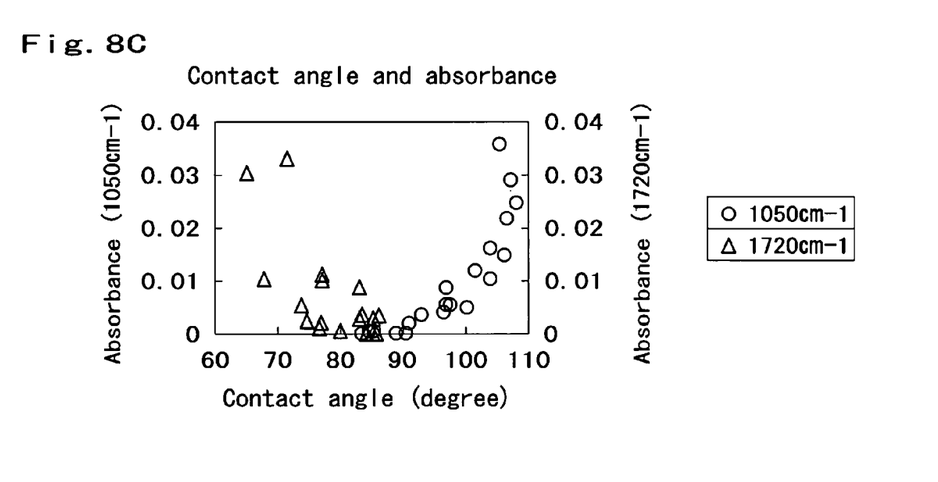
FIG. 8C is a graph showing the relationship between the contact angle and the absorbance.

[Experiment 1] Confirmatory Experiment of Coincidence Irradiation of Hydrophobic Monomer with Electron Beam By using MPTS and HEMA, a base material under consideration was immersed in a methanol solution (in the case of MPTS) and a solution (in the case of HEMA) whose monomer concentrations were 0 to 100 weight %, respectively, and reacted by coincidence irradiation with electron beams of 3, 5, 10, and 14 kGy at a temperature of 40° C. These were measured in absorbance (MPTS: 1050 $cm^{-1}$, HEMA: 1720 $cm^{-1}$) by means of a total reflection method (FT/IR analyzing system called attenuated total reflection: ART-FT/IR). The results are shown in the graphs of FIG. 7A and FIG. 7B. The measurement results of the contact angles at the same time are shown in FIG. 8A and FIG. 8B. According to these results, it was confirmed that, as surface modifying conditions, an adsorbed dose not less than 5 kGy is preferable in both of MPTS and HEMA, and a monomer concentration not less than 10 weight % is preferable. It was confirmed that 30 weight % is more preferable. It was also confirmed that the contact angle due to graft polymerization was raised to approximately 110 degrees in the case of MPTS, and reduced to approximately 70 degrees in the case of HEMA. The relationship between the contact angle and the absorbance is further shown in the graph of FIG. 8C. From this graph, it is confirmed that the change in contact angle correlates with the change in absorbance, and the contact angle changes due to the graft polymerization.

[Experiment 2] Confirmatory Experiment of Correlation Between Contact Angle and Frictional Property From the frictional force measurement results of the base material under consideration whose contact angle was variously changed due to electron beam coincidence irradiation graft polymerization shown in [Experiment 1], correlation between the contact angle and the frictional coefficient in a semi-dry state was confirmed. The frictional force measurement conditions were set as follows.

Figure 9:
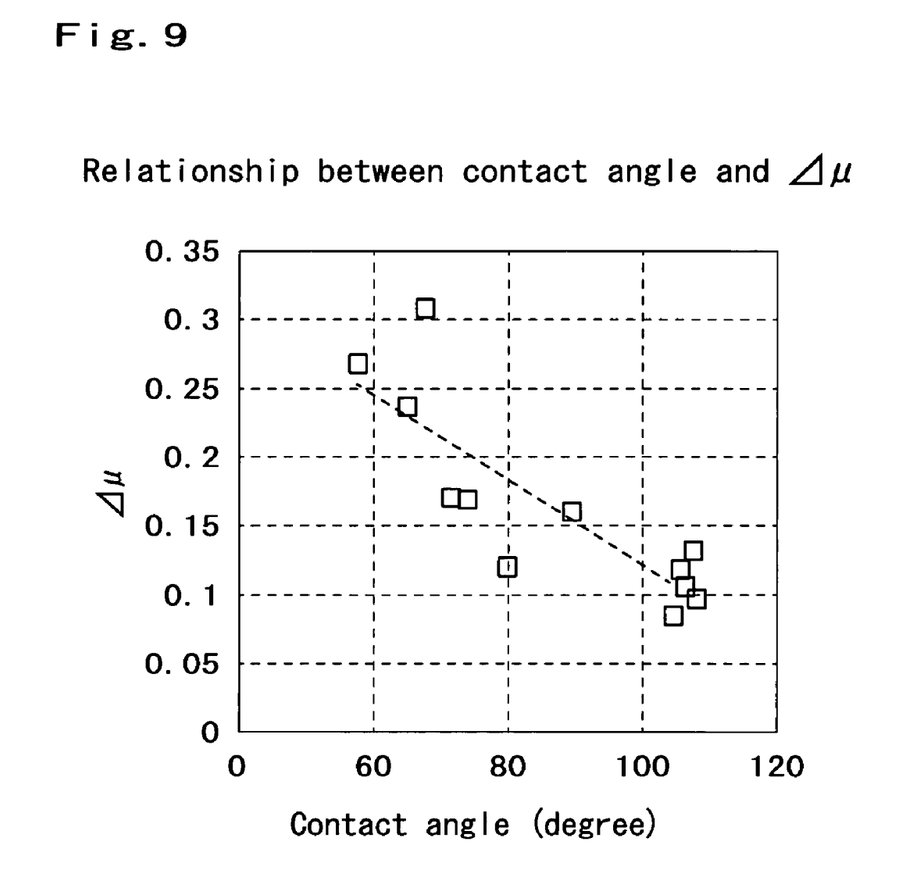
FIG. 9 is a graph showing the relationship between the contact angle and the frictional coefficient.

Sample width: 10 mm
Load: 15 gf
Sliding radius: 70 mm
Revolutions per minute: 173.5 rpm
Friction velocity: 1.3 m/s
Friction state: wet→dry
Humidity: 25° C., 70%
Material to be rubbed: glass plate In the above-described measurement conditions, from the relationship between the contact angle and the frictional force, the relationship between the contact angle and the frictional coefficient Δμ is shown in the graph of FIG. 9. From this, it is confirmed that as the contact angle increases, the occurrence of the semi-dry state is reduced. That is, concerning a contact angle between one side surface of the blade rubber and a water drop on the surface, it is confirmed that when this contact angle is approximately 60 degrees, a semi-dry state occurs, however, when the contact angle is 90 degrees or more, the occurrence of the semi-dry phenomenon is reduced, and with a contact angle over 100 degrees, the semi-dry phenomenon does not occur at all. From this fact, it is understood that a wiping failure due to a semi-dry state does not occur when the blade rubber shows hydrophobic properties, that is, has a contact angle of 90 degrees or more.

[Experiment 3] Comparative Experiment with the Existing Blade Rubber

Figure 10:
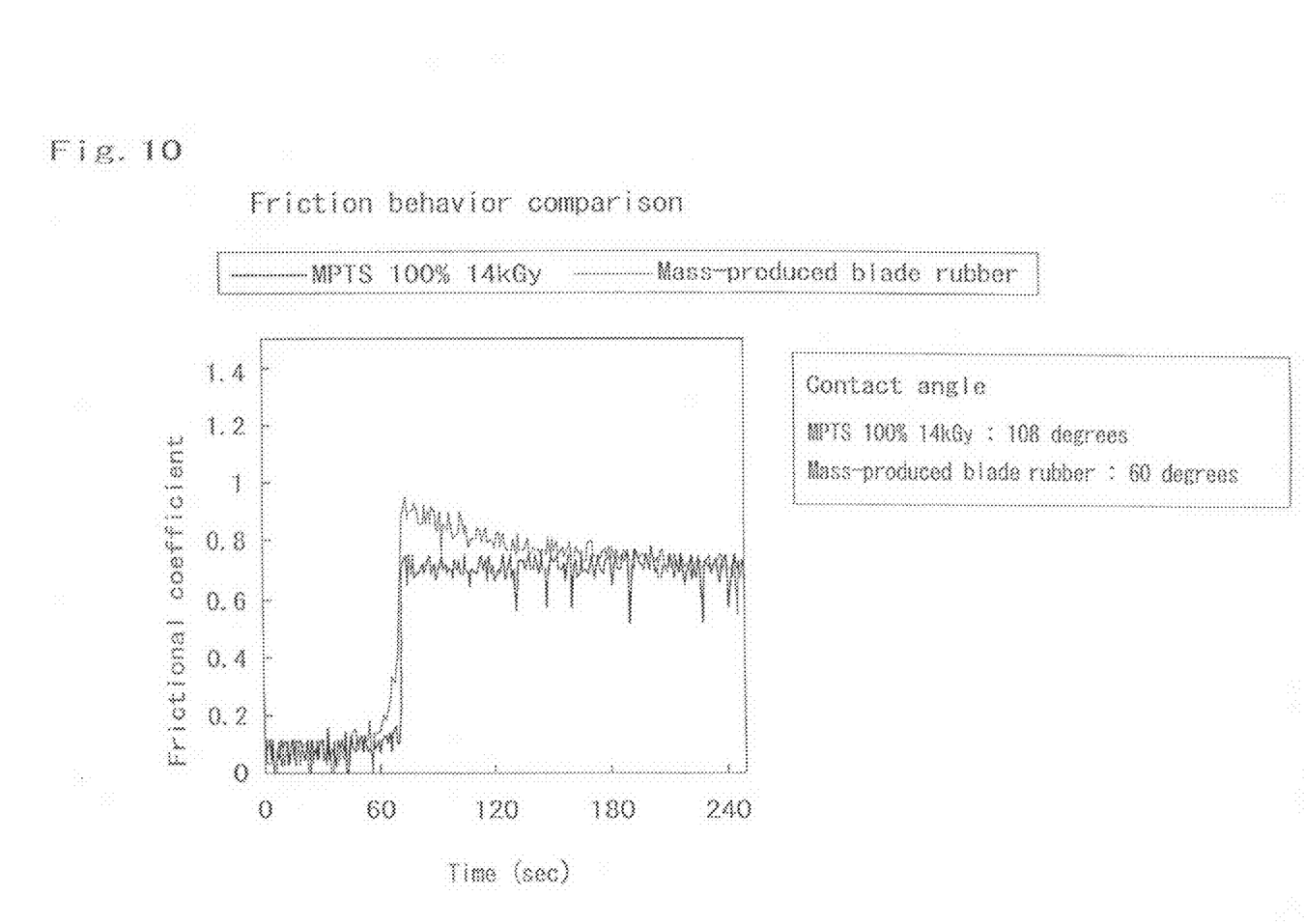
FIG. 10 is a graph of a comparison in friction behavior between a blade rubber whose surface was modified by setting the absorbed dose of an electron beam to 14 kGy and the MPTS concentration to 100 weight %, and a mass-produced blade rubber.

Last, by using a mass-produced blade rubber currently available on the market and a blade rubber with a length of 525 mm subjected to coincidence irradiation graft polymerization under the same experiment conditions as in Experiment 1 except that the MPTS was adjusted to 100 weight % and an absorbed dose was set to 14 kGy, a frictional resistance experiment was conducted for these blade rubbers, and their changes in frictional resistance with time elapse were examined. The results of this examination are shown in FIG. 10. In both blade rubbers, the state changed from wet to dry at a point exceeding 60 seconds, however, it was confirmed that the blade rubber subjected to coincidence irradiation graft polymerization reached almost a frictional coefficient of a dry state when it changed from wet to dry, and on the other hand, the mass-produced one reached a semi-dry state through a downward slope, and the blade rubber to which the present invention was applied becomes a blade rubber which involves no occurrence of a semi-dry state.

What is claimed is:

1. A method for modifying a blade rubber surface, comprising subjecting rubber of a blade rubber to irradiation treatment that generates radical active sites and polymerization after the irradiation treatment for graft polymerization starting from the generated radical active sites by the irradiation treatment,    wherein:

an absorbed dose in the irradiation treatment is not less than 5 kGy;

the concentration of monomer solution in a reaction solution in the polymerization step is not less than 10 weight %; and       a contact angle between one side surface of the blade rubber and a water drop dripping onto the one side surface is not less than 90 degrees.

2. The method of claim 1, wherein the graft polymerization is performed by using a hydrophobic monomer.

3. The method of claim 2, wherein the hydrophobic monomer is a polymerizable monomer having at least one or more of any one of a vinyl group ($CH_2$=CH—), isopropenyl group ($CH_2$=C($CH_3$)—), and allyl group ($CH_2$=$CHCH_2$—) in a molecule, and having, at a molecular end, a hydrophobic structure of any one of a hydrocarbon, organosilicon, and fluorine carbide, or a functional group into which hydrophobic properties can be introduced by secondary reaction after grafting.

* * * * *